Jan. 2, 1951 S. A. SCHERBATSKOY 2,536,314
RADIATION DETECTOR

Filed Oct. 17, 1949 2 Sheets—Sheet 1

INVENTOR.
Serge A Scherbatskoy
BY

Jan. 2, 1951 S. A. SCHERBATSKOY 2,536,314
RADIATION DETECTOR
Filed Oct. 17, 1949 2 Sheets-Sheet 2

INVENTOR.

BY

Serge A Scherbatskoy

Patented Jan. 2, 1951

2,536,314

UNITED STATES PATENT OFFICE 2,536,314

RADIATION DETECTOR

Serge A. Scherbatskoy, Tulsa, Okla.

Application October 17, 1949, Serial No. 121,669

5 Claims. (Cl. 250—83.6)

This invention relates to the detecting and measurement of radiation, and more particularly to a device of the Geiger counter type for measuring the intensity of such radiation as gamma rays.

An important object of this invention is to provide a measuring device of much higher efficiency than the conventional counter. Another object is to provide such a device which will be sufficiently rugged to be used in comparatively rough service such as in logging of wells and bore holes.

The conventional radiation detectors often consists of a thin-walled tubular metallic cathode and of an elongated thin wire-anode coinciding with the axis of the cathode tube. The anode and the cathode are enclosed in an envelope containing a suitable gaseous medium at a determined pressure. The detection of gamma rays by means of such an instrument is based upon an indirect process involving extraction of ionizing electrons. That is, the detector is not appreciably directly responsive to the passage of gamma rays, but is made to be responsive if gamma rays liberate ionizing electrons through the interaction with the cylindrical wall of the detector. The liberated electrons are drawn to the positive anode-wire colliding with the gas molecules in its path and thus liberating further electrons.

The ideal radiation counter is one which signals the passage of all photons by producing pulses of the shortest possible duration, the number of pulses being equal to the number of photons. The actual counter has, however, a low efficiency because only a small fraction of incoming photons releases the impulse producing electrons. The purpose of this invention consists therefore in increasing the efficiency of radiation counters by increasing the probability of interaction of photons or other radiation particles with matter.

Other objects and advantages of this invention will be apparent from the description which follows when taken with the drawings, in which.

Figures 1, 2:
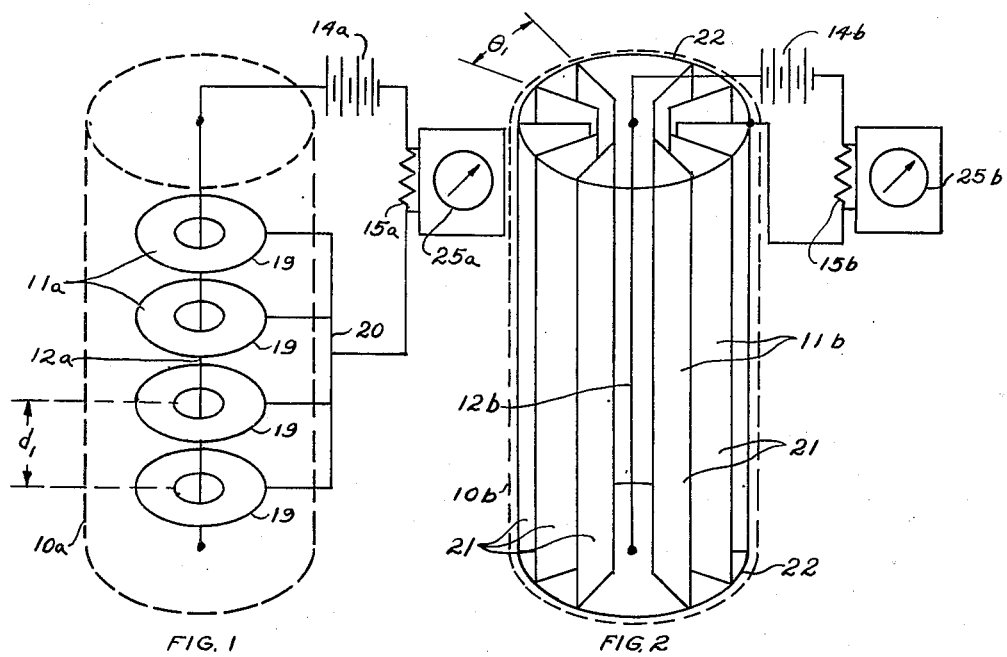
Fig. 1 shows in perspective a radiation counter of parallel plate type.
Fig. 2 shows in perspective a radiation counter of star type.

Referring now to Figs. 1 and 2, there are shown two radiation counters that have been developed in the last several years. These two counters do not contain the essential features of my invention. They are shown here merely for reference and comparison in order to illustrate better the main characteristics of my invention. The counter shown in Fig. 1 shall be preferred to as a parallel plate counter and its detailed description can be found in the U. S. Patent 2,398,934, issued to D. G. C. Hare. The counter shown in Fig. 2 shall be referred to as a star counter.

The elements that are common to both counters shall be designated by a numeral having a subscript $a$ in Fig. 1 and a subscript $b$ in Fig. 2.

The counters shown in Fig. 1 and Fig. 2 incorporate as their essential elements gas filled housing $10a$ and $10b$ containing cathode structures $11a$, $11b$, and a wire anode $12a$, $12b$. A suitable gas content consists of nine parts argon and one part xylol at a pressure range between one to sixteen centimeters of mercury. The anodes $12a$, $12b$ are connected to the positive terminals of sources of potential $14a$, $14b$ through resistors $15a$, $15b$, and the cathode is connected to the negative terminal of said sources.

The anode structure of the parallel plate counter shown in Fig. 1 consists of a plurality of plates $19$ positioned one underneath the other and provided with perforations through which the cathode wire passes. The anode plates are maintained at the same potential by leads $20$.

The anode structure of the star counter shown in Fig. 2 consists of a plurality of metallic plates $21$ disposed along the radial planes symmetrically with respect to its axis. The plates have their outer edges set into metallic rings $22$ which provide electrical connections therebetween.

The potential applied between the cathode wire and the anode structure either of the type shown in Fig. 1 or Fig. 2 is derived from the sources $14a$, $14b$ and is approximately the threshold potential so as to initiate a discharge in the tube in response to the passage of an ionizing electron through the space between the cathode and the anode. As is well understood in the art, the potential is not high enough to initiate a discharge in the absence of an ionizing electron.

Each ionizing electron is usually extracted from the cathode of the counter by an incoming photon and causes a discharge impulse by a resultant avalanche of ions, that is, a large quantity of electricity flows for a short time in the counter circuit. This current causes a large voltage drop across the resistors 15a, 15b and the discharge will cease after a very short period of time. The frequency of these current impulses can be rendered perceptible if sensitive frequency measuring instruments 25a, 25b are connected across the terminals of the resistors 15a, 15b which instruments indicate the intensity of incoming radiation by a needle deflection.

The probability of gamma ray photons causing ionization in the gas is very small because not every photon extracts an ionizing electron from the surface of the counter and a great many of them traverse the counter without producing any measurable effect. The ionization effectiveness of gamma radiation may be increased, however, by enlarging the effective surface exposed to radiation. Thus a larger number of electrons is extracted, and a larger number of counts is obtained as a measure of the incoming radiation.

The efficiency E of a gamma ray counter is defined as the ratio of the observed counts $N_0$ to the number of gamma ray photons $n$ which pass through the counter during this time, i. e.

$$E = \frac{N_0}{n}$$

Figure 3:
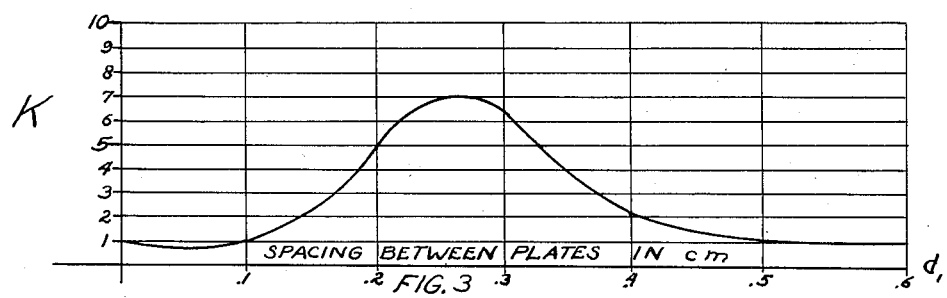
Fig. 3 shows graphically a relationship between the efficiency of the parallel plate counter and the linear spacing of the plates forming its anode.

My investigations have shown that in the parallel plate arrangement of Fig. 1 there is a minimum distance between the parallel plates 19 below which the efficiency decreases. It has been determined that this decrease in efficiency is due to the fact that the field from anode wire 12a does not penetrate into the deep crevices between the parallel plates. If we define the factor K as being the ratio of the efficiency of a parallel plate type counter as compared to that of an ordinary counter of the cylindrical type having the same external dimensions, then it is possible to express variations in efficiency as a function of various internal configurations of the cathode. In the counter of the parallel plate type the efficiency is a function of the spacing between the plates. Fig. 3 shows this relationship that has been determined experimentally; the abscissas in Fig. 3 represent various values of spacings $d_1$ between plates (expressed in cm.) 19 and ordinates show the corresponding values of K. It is apparent from Fig. 3 that the optimum spacing $d_1 = .27$ cm. and the efficiency at this spacing corresponds to $K = 7$.

Figure 4:
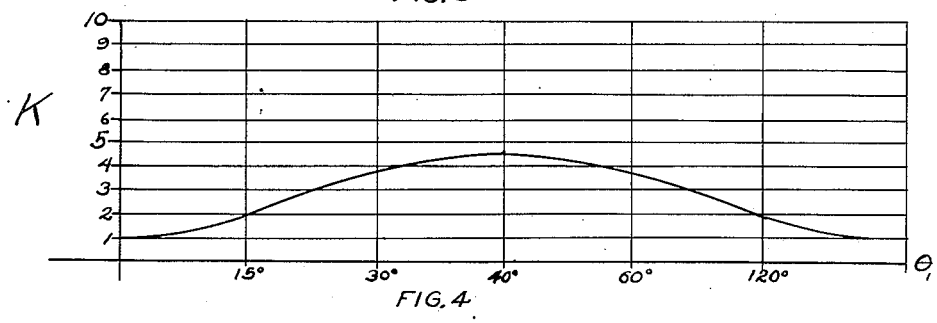
Fig. 4 shows graphically a relationship between the efficiency of a star counter and the angular spacing of the plates forming its anode.

Consider now the counter in which the plates, instead of being perpendicular to the axis are arranged radially as shown in Fig. 2 and let $\theta$, designate the angle expressed in degrees between the two neighboring radial plates 21. It is apparent that if $n$ designates the total number of the plates 21, then $n\theta = 360°$. Fig. 4 shows the relationship determined experimentally between the angular spacing $\theta$, separating two neighboring plates 21 and the corresponding values of K. It is apparent from Fig. 4 that the optimum angular spacing between the two neighboring plates is 40° and the efficiency at this spacing corresponds to $K = 5$.

From the curves of Fig. 3 and Fig. 4 it can be seen that there is an optimum spacing between the plates that give maximum efficiency and when more plates are introduced than the number corresponding to the maximum efficiency, self-shielding takes place and the field from the anode wire is incapable of penetrating completely into the narrow crevices determined by the plates.

The counter designed in accordance with the present invention goes beyond the efficiency limitations exemplified in Fig. 3 and Fig. 4. It combines the features of both counters of Fig. 1 and Fig. 2 and makes it possible to obtain an efficiency exceeding considerably those of these counters.

Figure 5:
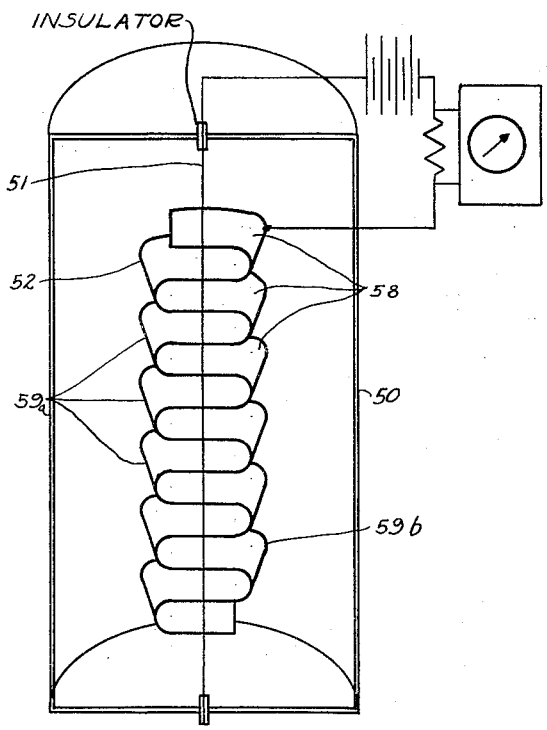
Fig. 5 shows in perspective some of the elements of the counter designed in accordance with the present invention.
Figure 6:
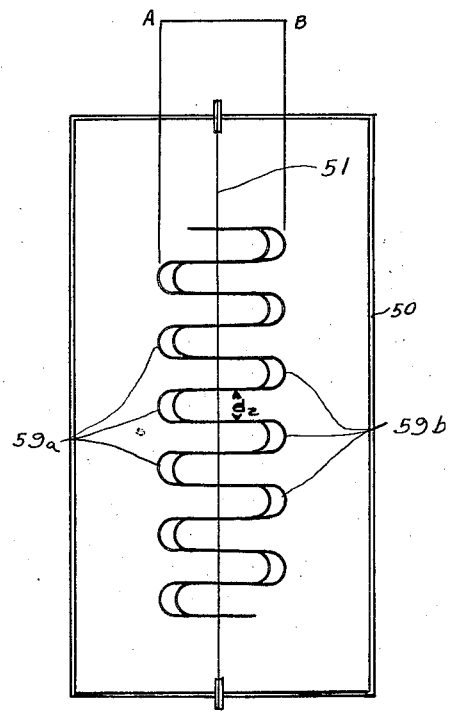
Figs. 6 and 7 show, respectively, a horizontal and a vertical cross sectional view of the counter designed in accordance with the present invention.
Figure 7:
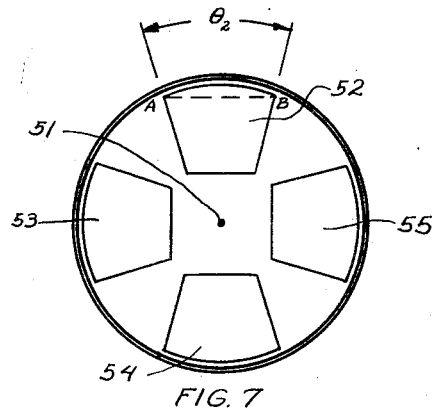

Consider now Fig. 5, Fig. 6, and Fig. 7 which show a high efficiency counter embodying the principles of the present invention. Fig. 5 shows in perspective the structural arrangement of one of the electrodes and Fig. 6 and Fig. 7 give a more complete representation of various structural details in longitudinal and horizontal cross section, respectively.

The counter shown therein comprises a cylindrical housing 50 which contains a suitable gas such as, for instance, nine parts argon and one part xylol at a pressure between one and 16 cm. of mercury. Coaxially with the housing is stretched a fine insulated wire 51 which serves as the anode. The cathode structure consists of four separate and identical units arranged symmetrically with respect to the central wire and designated by numerals 52, 53, 54, and 55, respectively. Each of these units has an undulated or zigzag-like structure the undulations of which are extending in the direction parallel to the axis of the wire. One of these structures designated by 52 is shown in perspective in Fig. 5. The structure 52 consists essentially of parallel equidistance plates 58 arranged transversely with respect to the wire and connected one to another in sequence and on alternate sides by vertical plates 59a and 59b so as to form a single zigzag-like structure. The plates 58 are in form of circular segments separated one from another by a distance $d_2$. Each of these segments subtends an angle $\theta_2$. All the vertical plates 59a and all the vertical plates 59b are respectively contained in two radial planes passing through the wire 51 and forming an angle $\theta_2$ therebetween. The distance $d_2$ shall be also designated as the width of the undulation whereas the amplitude of the undulation shall be designated by segment AB and shall represent the maximum length of each of the horizontal plates 52. Each of the ribbons has its plane of symmetry passing through the axis of the wire 51 and the undulations are such that their width $d_u$ is small when compared to their amplitude AB. Such a structure is very easy to manufacture and is readily adapted to press die forming fabrication.

If we now compare the counter of Fig. 5, Fig. 6, Fig. 7 with the counters of Fig. 1 and Fig. 2, we can readily see that the anode structure comprising all the four undulated units 52, 53, 54, 55 can be considered as a combination of all the elements present both in a parallel plate type and in a star type counter. In particular, all the horizontal plate segments of the units 52, 53, 54, 55 are located in planes perpendicular to the wire 51 and have surfaces approximately equal to the corresponding surfaces of the circular plates of Fig. 1.

Similarly, the vertical plates that are located in a single radial plane such as 59a or such as 59b have a total surface equal to the half of the surface of a corresponding radial plate in Fig. 2.

An important design feature of my counter is based upon the proper selection of the value $d_2$ and the value $\theta_2$. The value $d_2$ has been determined from Fig. 3 and corresponds to the maximum efficiency of the counter with horizontal plates as shown in Fig. 1, i. e. $d_2=d_1=.27$ cm. The value $\theta_2$ has been determined from Fig. 4 and corresponds to the maximum efficiency of the counter with vertical plates as shown in Fig. 2, i. e. $\theta_2=\theta_1=40$. It is thus apparent that I have combined the advantages obtained from the arrangement of Fig. 3 and Fig. 4. The maximum advantage that can be obtained with the arrangement of Fig. 4 is a K of about 7 and the maximum advantage that can be obtained with the arrangement of Fig. 2 is a K of about 4.5. By the employment of the principles of my invention it is possible to realize factors corresponding to a K of 10 to 15.

If we compare again the geometry of the cathode structure as shown in Figs. 6 and 7 with the cathode structures of the parallel plate counter of Fig. 1 and the star counter of Fig. 2, it becomes apparent that the total surface of the circular segments such as 58 is equal to the total surface of circular plates 19 in Fig. 1. Furthermore, the total surface of the rectangular plates such as 59a, 59b is equal to the half of the total surface of the radial plate 21 in Fig. 2. Consequently, the total effective cathode surface of the counter designed in accordance with my invention is equal to the total effective surface of the parallel plate counter at maximum efficiency plus the half of the total effective surface of the star counter at its maximum efficiency.

I claim:

1. A radiation detecting device comprising a wire electrode, an undulated ribbon electrode in the neighborhood of said wire electrode, said undulated ribbon electrode consisting of a plurality of parallel plate segments arranged one above the other substantially transversally to said wire electrode and a plurality of connecting plate segments substantially parallel to said wire electrode, said connecting segments interposed between said plate segments to form the undulations, an ionizable medium between said electrodes, and an ionization responsive circuit between said electrodes.

2. A radiation detecting device comprising a wire electrode, another electrode comprising a plurality of undulated ribbons connected electrically and disposed in separate relation symmetrically with respect to said wire electrode, each of said ribbons being undulated in a direction parallel to said wire electrode and having amplitudes of said undulations large comparing to the distance between two successive undulations, an ionizable medium between said electrodes, and an ionization responsive circuit between said electrodes.

3. A radiation detecting device comprising a wire electrode, another electrode comprising a plurality of undulated ribbons connected electrically and disposed in separate relation symmetrically with respect to said wire electrode, the direction of the undulations of each of said ribbons being parallel to the axis of said wire electrode and said undulattions being symmetrical with respect to a plane passing through said axis, whereby the planes of symmetry of each of said ribbons are radially disposed with respect to said axis, an ionizable medium between said electrodes, and an ionization responsive circuit connected between said electrodes.

4. A radiation detecting device comprising a wire electrode, a plurality of undulated ribbons, connected electrically one to another to form the other electrode, each of said ribbons being contained in the space between two radial planes passing through the axis of said wire and having its undulations in the direction parallel to the axis of said wire, said ribbons being arranged in separate relation symmetrically with respect to said wire electrode.

5. A radiation detecting device comprising a wire electrode, a plurality of undulated ribbons connected electrically and disposed in separate relation symmetrically with respect to said wire electrode, each of said undulated ribbons consisting of a plurality of parallel plate segments arranged one above the other substantially transversally to said wire electrode and a plurality of connecting plate segments substantially parallel to said wire electrode, said connecting segments interposed between said plate segments to form the undulations, said undulated ribbons being exposed to impinging radiation and emitting electrons as a result of the interaction with said radiation, an ionizable medium between said wire element and said undulated plates, said medium being adapted to be ionized by said electrons and means for producing an electrostatic field converging at said wire element for collecting the products of ionization at said wire element, said ionization products indicating said radiation.

SERGE A. SCHERBATSKOY.

REFERENCES CITED

The following references are of record in the file of this patent:

UNITED STATES PATENTS

| Number | Name | Date |
|---|---|---|
| 2,071,849 | Lowry | Feb. 23, 1937 |
| 2,397,071 | Hare | Mar. 19, 1946 |